(12) United States Patent
Loprieno

(10) Patent No.: US 7,684,419 B2
(45) Date of Patent: Mar. 23, 2010

(54) ETHERNET ENCAPSULATION OVER OPTICAL TRANSPORT NETWORK

(75) Inventor: Gilberto Loprieno, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 970 days.

(21) Appl. No.: 11/109,139

(22) Filed: Apr. 19, 2005

(65) Prior Publication Data

US 2006/0233194 A1    Oct. 19, 2006

(51) Int. Cl.
*H04L 12/28* (2006.01)
(52) U.S. Cl. .................. 370/401; 370/382; 370/466
(58) Field of Classification Search .......... 370/392, 370/389, 474, 401, 466, 349; 709/236
See application file for complete search history.

(56) References Cited

U.S. PATENT DOCUMENTS

| | | | |
|---|---|---|---|
| 5,020,054 A * | 5/1991 | May, Jr. .................. 370/474 |
| 5,655,140 A | 8/1997 | Haddock et al. |
| 5,999,541 A * | 12/1999 | Hinchey et al. ............ 370/466 |
| 6,879,645 B1 * | 4/2005 | Webber et al. ............ 375/317 |
| 6,882,662 B2 * | 4/2005 | Subrahmanyan et al. .... 370/506 |
| 6,907,048 B1 * | 6/2005 | Treadaway et al. ......... 370/474 |
| 7,106,968 B2 * | 9/2006 | Lahav et al. ................ 398/47 |
| 7,190,695 B2 * | 3/2007 | Schaub et al. .............. 370/392 |
| 7,242,682 B1 * | 7/2007 | Mueggenberg et al. ...... 370/389 |
| 7,327,745 B2 * | 2/2008 | Takeuchi et al. ............ 370/401 |
| 2003/0079004 A1 | 4/2003 | Mitsumori et al. |
| 2003/0188026 A1 | 10/2003 | Denton et al. |
| 2004/0202198 A1 | 10/2004 | Walker et al. |

OTHER PUBLICATIONS

Agilent Technologies, "An Overview of ITU-TG.709", Sep. 2001, pp. 1-12.

* cited by examiner

*Primary Examiner*—Ricky Ngo
*Assistant Examiner*—Chandrahas Patel
(74) *Attorney, Agent, or Firm*—Cindy Kaplan

(57) ABSTRACT

A method and system for encapsulating a frame for transport over an optical transport network are disclosed. A method includes receiving a packet at a network device and encapsulating the packet. The packet is received from a network having a line frequency different than a payload frequency of the optical transport network and the encapsulated packet is configured for transport directly over the optical transport network without modification to compensate for the different frequencies.

19 Claims, 4 Drawing Sheets

ETHERNET ENCAPSULATION OVER OPTICAL TRANSPORT NETWORK

BACKGROUND OF THE INVENTION

The present invention relates generally to data communication networks, and more specifically, to a method and system for transporting Ten Gigabit Ethernet (GE) over OTN (Optical Transport Network)

Efficient transfer of traffic requires a network designed in conformance with conventional voice network and suitable for transferring variable length packets. Conventionally, there is SONET/SDH as a digital network for WAN (Wide Area Network). These networks commonly use technology for encapsulating data of a higher-layer protocol such as Media Access Control (MAC) frames on Ethernet and transmitting the data on a transport network. GFP, defined in ITU-T G.7041, is a generic mechanism for protocol data unit (PDU) oriented client signal adaptation to enable data mapping into a SONET/SDH virtual container and specifies the framing format for a number of link protocols, such as Ethernet. GFP provides a means to map different signals into SONET/SDH and the optical transport network. It also defines the frame formats for protocol data units (PDUs) transferred between GFP initiation and termination points, as well as the mapping procedure for the client signals into GFP. GFP supports many types of packets, including Ethernet frames. FIG. 1 illustrates the mapping of an Ethernet MAC frame 12 into GFP frame 14. As shown in FIG. 1, the Start of Frame Delimiter and 7 bytes of preamble are removed (total of 8 bytes) and replaced with GFP overhead.

ITU recommendation G.709 ("Interface for the Optical Transport Network (OTN)") builds on the experience and benefits gained from SDH and SONET to provide a route to the next-generation optical network. The ITU-T G.709 frame includes three parts: overhead area for operation, administration, and maintenance functions; payload area for customer data; and forward error correction (FEC). FEC provides additional coded data to enable error checking and correction by a receiving device.

Transport of 10 GE LAN over OTN is becoming an important feature. ITU-T G.709 links running at an appropriate rate can carry 10 Gigabit Ethernet and future rate Ethernet. However, there are difficulties with the transport of 10 Gigabit Ethernet LAN over OTN. For example, 10 Gigabit Ethernet LAN without 64/66 encoding has a line frequency of 10 Gb/s, while payload of OTN has a frequency of 9.995276962 Gb/s. Since 10 Gigabit Ethernet LAN has a higher frequency as compared with the OTN payload, an operation is required to reduce the incoming frequency.

Conventional solutions to this problem include increasing the output frequency or using bytes defined as overhead by G.709 to transport payload. Another option is to add a pause mechanism to reduce the maximum data throughput. However, each of these conventional methods has drawbacks. For example, addition of a pause mechanism requires a large amount of memory.

SUMMARY OF THE INVENTION

A method and system for encapsulating a frame for transport over an optical transport network are disclosed. A method includes receiving a packet at a network device and encapsulating the packet. Encapsulation of the packet includes removing one or more fields from the packet and inserting overhead in the packet. The packet is received from a network having a line frequency different than a payload frequency of the optical transport network and the encapsulated packet is configured for transport directly over the optical transport network without modification to compensate for the different frequencies.

The packet may be, for example, an Ethernet packet, and more specifically, a 10 Gigabit Ethernet LAN packet. The fields removed from the packet may include a preamble field, start of frame delimiter field, interpacket gap, and a frame check sequence field. The overhead inserted into the packet preferably contains four or less bytes of data.

In another aspect of the invention, a method for mapping an Ethernet frame to an optical transport network generally comprises receiving an Ethernet packet from a network operating at a first frequency, removing a preamble field and a start of frame delimiter field from the Ethernet packet, inserting overhead in the packet, and transporting the packet directly over the optical transport network operating at second frequency different from the first frequency.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DETAILED DESCRIPTION OF THE INVENTION

Figure 1:
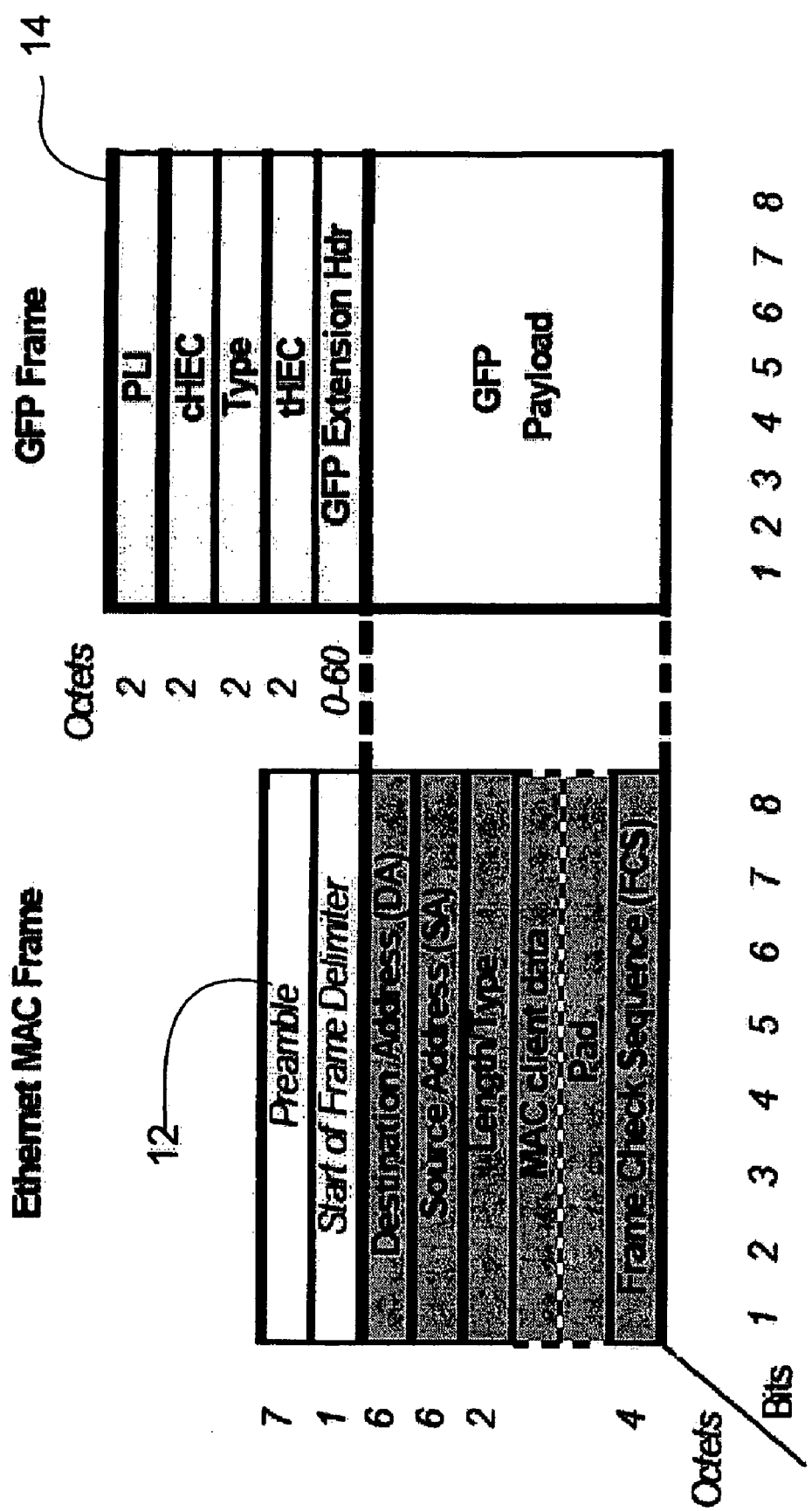
FIG. 1 illustrates mapping of Ethernet payload into GFP.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

In one embodiment of the present invention, a method and system provide for the transport of 10 Gb/s Ethernet (GE) LAN over Optical Transport Network (OTN). A packet received from the Ethernet network has a line frequency different than a payload frequency of the optical transport network and is encapsulated so that it can be transported directly over the optical transport network without modification to compensate for the different frequencies. As described in detail below, a new mapping protocol (referred to as Advance Ten Gigabit Ethernet Encapsulation (ATGEE) is used in place of GFP (defined in ITU-T G.7041) to transport 10 GE LAN over OTN compliant with the ITU-T G.709 standard.

The method and system operate in the context of a data communication network including multiple network elements. The network may be a packet based optical network that uses Ethernet data layer at speeds of 10 Gb/s (or above or below 10 Gb/s), both over high speed point-to-point circuits (i.e., dark fiber) and over WDM. However, it is to be understood that the system may be used with media types different than those described herein, without departing from the scope of the invention. A network element may be, for example, a terminal multiplexer, an add-drop multiplexer (ADM), an optical crossconnect (OXC), a signal regenerator, router, switch, or other optical node interface.

When Ethernet traffic is sent to an optical transport network, the Ethernet frames are first mapped into a frame with an appropriate structure and then mapped to the optical transport network (or other appropriate payload envelope). The signal may be mapped into a frame of a long-haul DWDM transport platform, such as ONS 15808, available from Cisco Systems, Inc. of San Jose, Calif., for example. The following describes how ATGEE may be used to transport 10 GE LAN interface over an OTN, such as OPU2. In one embodiment, the system provides rate adaptation between a 10 GE client interface (10 Gb/s (without 64/66 encoding)) and a G.709 payload rate (9.995276962 Gb/s). In one example, the 10 GE frequency may be as high as 10.001 Gb/s, and transported into OTN payload having a frequency of 9.995077056 Gb/s, as described below.

It is to be understood that the frequency values set forth herein are only examples and that the system and method described below may be used to transport Ethernet having a frequency other than 10 Gb/s onto an OTN having a different frequency than discussed herein. Furthermore, although the invention is described using an Ethernet packet, other types of packets having a preamble may also be used. Thus, the term "Ethernet packet" or "Ethernet frame" as used herein includes packets or frames formatted according to standards other than IEEE 802.3.

Referring now to the drawings, and first to FIG. 1, an example of an Ethernet frame 12 is shown. The frame includes a preamble, start of frame delimiter (SFD), destination address, source address, length or type field, MAC client data field, pad, and frame check sequence (FCS).

Figure 2:
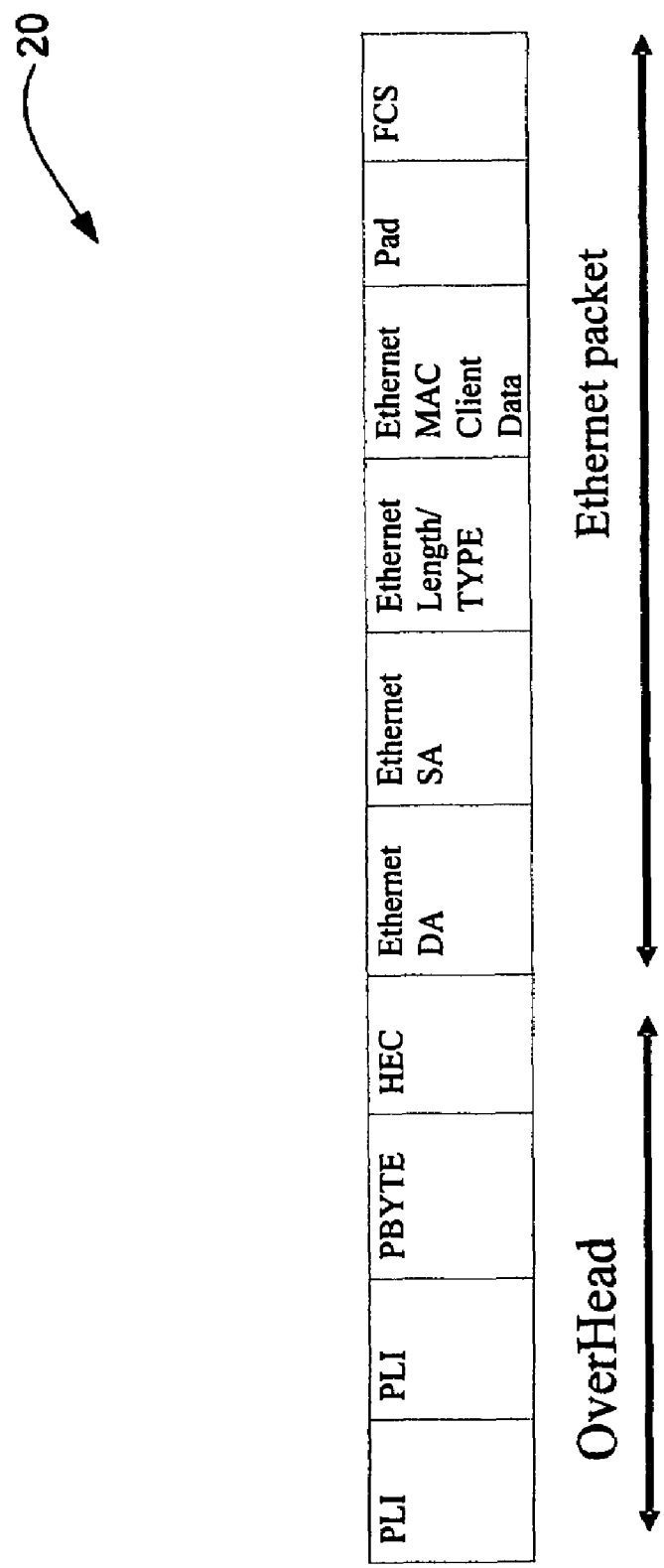
FIG. 2 illustrates an Ethernet packet encapsulated according to one embodiment of the present invention.

One example of an encapsulation of the Ethernet frame using the method and system of the present invention is shown in FIG. 2. The preamble and start of frame delimiter are removed, as with GFP, however only 4 bytes are added, instead of the 8 bytes required by GFP. The destination address, source address, length/type, MAC client data, pad, and FCS fields remain. The new fields of the encapsulated frame 20 are: PLI; PBYTE; and HEC. PLI is the PDU Length Indication field and contains the payload length. It is used to find the end of the frame (for delineation).

The PBYTE field summarizes many functionalities. The following are examples of PBYTE frame values:

PBYTE [7:6]="00" User data Frame
    "10" Command Management Frame
PBYTE [5:4]="01" Client Signal Fail LOS of Client
PBYTE [5:4]="10" Client Signal Fail LOSync of Client
PBYTE [3:0]=Channel ID The HEC (Header Error Check) is preferably the same as defined in ITU-T I.432 (Generator Polynomial $X^8+X^2+1$). There is no additional FCS added at the end of the packet. The IPG (InterPacket Gap) is preferably removed and all overhead bytes specified by ITU-T G.709 for OAM are available for use.

It is to be understood that other related or unrelated fields may be included between any of the fields shown in FIG. 2, or the fields may be in a different order without departing from the scope of the invention.

Rules relating to GFP are preferably applied as set forth in ITU-T G.7041, except for the following changes. HEC is calculated on 8 bits instead of 16 bits. The structure of the overhead is also changed. The GFP overhead is replaced by 2 bytes PLI (packet length), 1 byte PBYTE and 1 byte HEC. Error detection and correction and alignment are preferably performed as done for GFP. Also, idle packets are inserted as performed for GFP.

Figure 3:
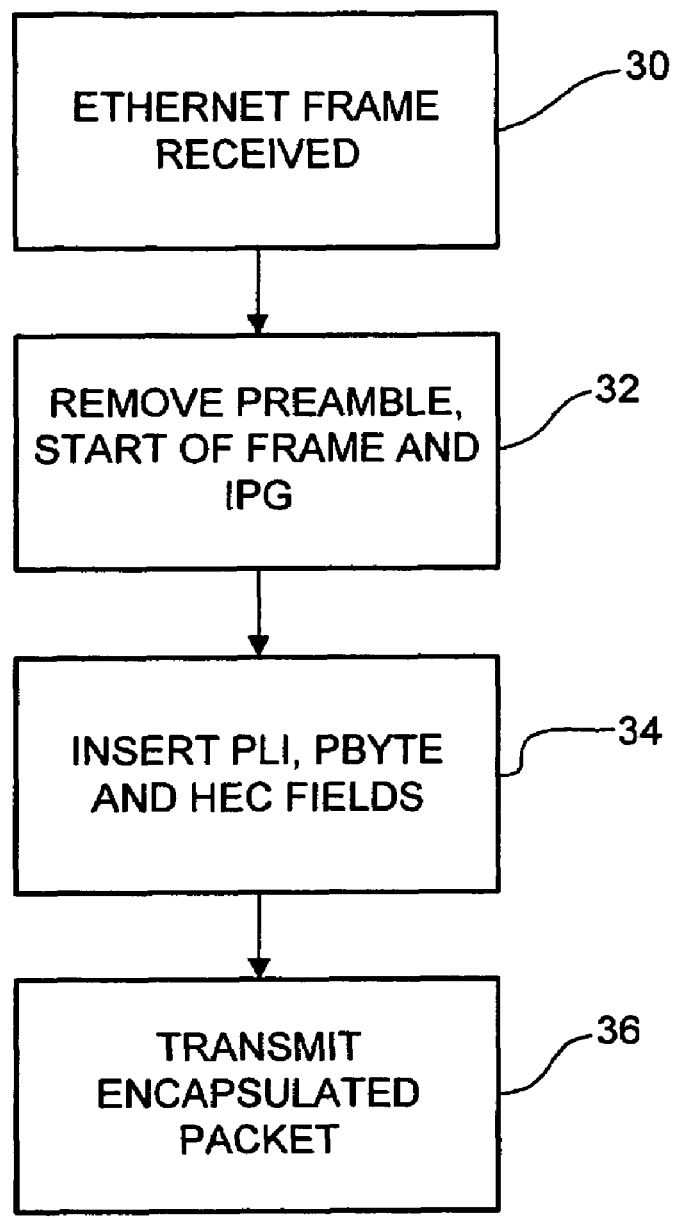
FIG. 3 is a flowchart illustrating a process for transporting 10 GE over OTN.

FIG. 3 is a flowchart illustrating a process of the present invention for encapsulating Ethernet over OTN. At step 30, an Ethernet frame is received at a network device. The Preamble and Start of Frame Delimiter are removed along with the IPG (step 32). The PLI, PBYTE and HEC fields are inserted into the packet (step 34) and the packet is transmitted over the optical transport network (step 36).

The following sets forth an exemplary calculation for OPU2 mapping with the method described above. As previously noted, the worst case frequency for 10 GE LAN transport over OPU2 is 10 GE+100 ppm=10.001 Gb/s transported into OTN payload having a frequency of 9.995276962 Gb/s−20 ppm=9.995077056 Gb/s. For each 10 GE packet, 8 bytes are removed (preamble (7)+Start of Packet Delimiter (1)). For the encapsulation, 4 bytes are added. The minimum IPG between packets is 5 (worst case) so 5 bytes are removed. Thus, a total of 9 bytes are removed for each packet. The maximum packet size can be calculated as follows:

$$(9+X)/10.001 \text{ Gb/s} = X/9.995077056 \text{ Gb/s}$$

$$9.995077056(9+X) = 10.001X$$

$$(10.001 - 9.995077056)X = 9*9.995077056$$

$$X < 15800 \text{ Bytes}$$

The maximum packet size must therefore be less than 15800 bytes. An Ethernet packet has a maximum size of 1518 bytes and a jumbo packet has a size of 9600 bytes. Jumbo frames having length equal to 9600 bytes can be transported since the system can support frames up to 15800 bytes.

The method described above may be modified so that the 10 GE LAN FCS is removed. In this case, 4 additional bytes are available and X<21900 bytes. This allows jumbo frames up to 21900 bytes to be transported.

Figure 4:
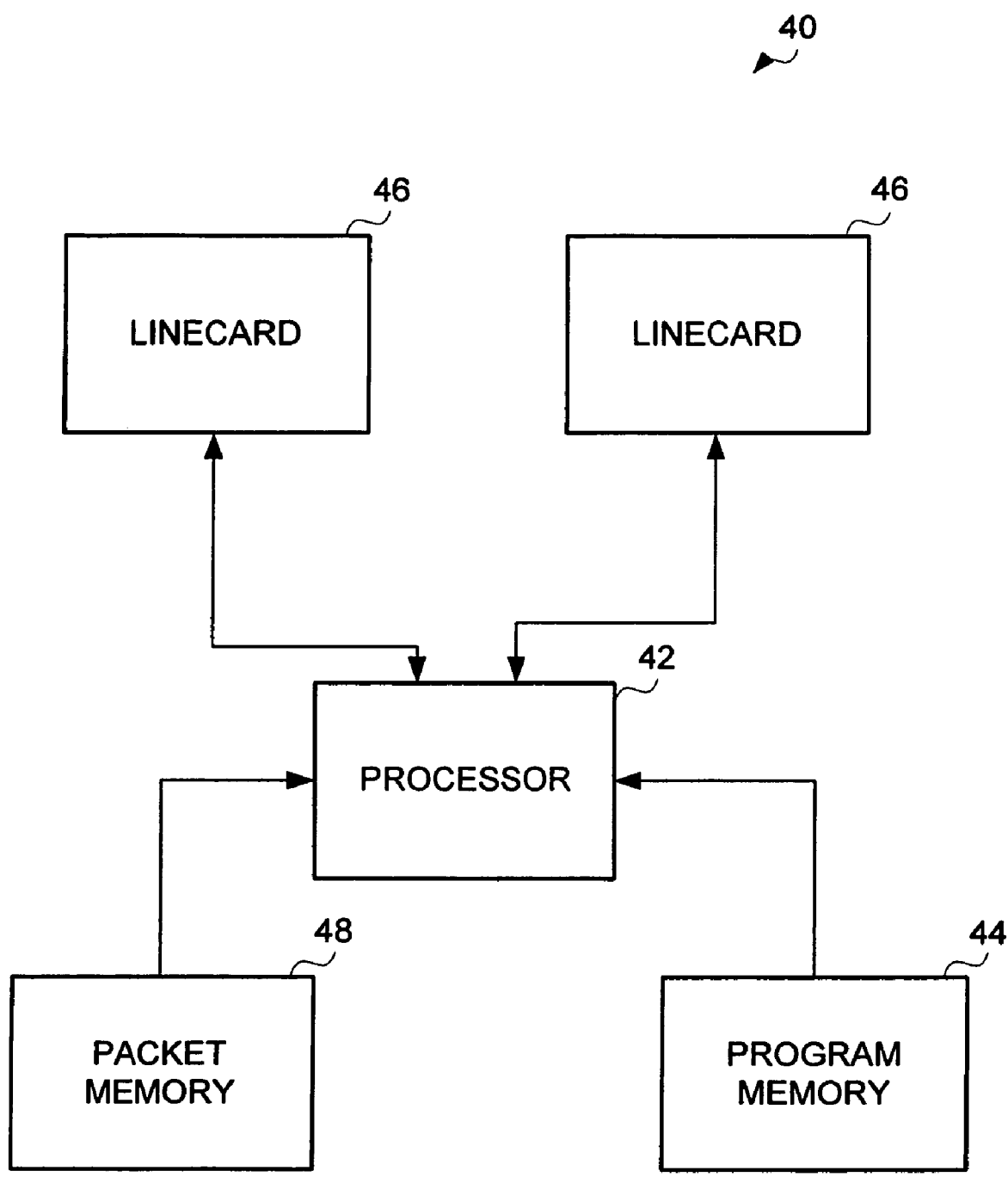
FIG. 4 is a system block diagram of a network device that can be utilized to execute software of an embodiment of the present invention.

The invention described herein may be implemented in dedicated hardware, microcode, or software. FIG. 4 depicts one example of a network device 40 that may be used to implement the method and system described above. In one embodiment, network device 40 is a programmable machine that may be implemented in hardware, software, or any combination thereof. A processor 42 executes code stored in a program memory 44. Program memory 44 is one example of a computer-readable medium. Program memory 44 can be a volatile memory. Another form of computer-readable medium storing the same codes would be some type of non-volatile storage such as floppy disks, CD-ROMs, DVD-ROMs, hard disks, flash memory, etc.

Network device 40 interfaces with physical media via a plurality of linecards 46. Linecards 46 may incorporate Ethernet interfaces, DSL interfaces, Gigabit Ethernet interfaces, 10-Gigabit Ethernet interfaces, SONET interfaces, ITU-T G.709 OTN interfaces, etc. As packets are received, processed, and forwarded by network device 40, they may be stored in a packet memory 48. Packet transmission operations may occur partially or completely within one of linecards 46. To implement functionality according to the present invention, linecards 46 may incorporate processing and memory resources similar to those discussed above in connection with the network device as a whole.

Network device 40 shown in FIG. 4 is only one example of a computer system suitable for use with the invention. Other devices and systems having different configurations or subsystems may also be utilized. For example, the mapping of the Ethernet frames may be performed using hardware which may include, but is not limited to, an application specific integrated circuit (ASIC) or a field-programmable gate array (FPGA). That is, substantially any suitable hardware may be configured to implement the various functionalities described above.

As can be observed from the foregoing, the present invention has many advantages. The method and system described herein allow for the transport of 10 GE LAN over OTN fully compliant with currently used frame structure and frequency, as set forth in G.709. Furthermore, the method and system requires less overhead bytes than conventional mapping methods, such as GFP. ATGEE allows for the transport of packets without use of a pause mechanism to slow down traffic or modification to the OTN envelope.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for encapsulating a packet for transport over an optical transport network, the method comprising:
   receiving a Gigabit Ethernet packet at a network device;
   encapsulating said packet, said encapsulating comprising:
      replacing a preamble and a start of frame delimiter in said received Ethernet packet with overhead comprising a field configured to identify a client signal fail and a channel ID, wherein said overhead comprises a fewer number of bytes than the number of bytes removed from said packet, wherein replacing comprises removing eight bytes and inserting four bytes into said packet; and
   transporting said packet over the optical transport network;
   whereby said packet is received from a network having a line frequency different than a payload frequency of the optical transport network and said encapsulated packet is configured for transport directly over the optical transport network without modification to compensate for the different frequencies.

2. The method of claim 1 wherein said overhead further comprises a field indicating if said packet is a user data frame or a command management frame.

3. The method of claim 1 wherein said Gigabit Ethernet packet is a 10 Gigabit Ethernet LAN packet and wherein said transported packet corresponds to a frame structure set forth in ITU G.709 standard.

4. The method of claim 1 wherein said overhead further comprises a PDU length indication field and a header error check.

5. The method of claim 1 further comprising removing interpacket gap from said received packet.

6. The method of claim 1 further comprising removing a frame check sequence field from said received packet.

7. The method of claim 1 wherein transporting said packet comprises mapping said packet into an OPU2 frame.

8. The method of claim 1 further comprising performing error detection and correction and alignment, and inserting idle packets.

9. The method of claim 1 wherein said overhead comprises a PBYTE field containing said client signal fail and said channel ID.

10. An apparatus comprising:
    a processor,
    a computer-readable storage medium that stores instructions for execution by the processor, the instructions, comprising:
    code for reading a Gigabit Ethernet packet received at a network device;
    code for encapsulating said packet, said encapsulation code comprising:
       code for replacing a preamble and a start of frame delimiter in said received Ethernet packet with overhead comprising a field configured to identify a client signal fail and a channel ID, wherein said overhead comprises a fewer number of bytes than the number of bytes removed from said packet, wherein replacing comprises removing eight bytes and inserting four bytes into said packet; and
    code for transmitting said packet over the optical transport network;
    whereby said packet is received from a network having a line frequency different than a payload frequency of the optical transport network and said encapsulated packet is configured for transport directly over the optical transport network without modification to compensate for the different frequencies.

11. The computer-readable storage medium of claim 10 further comprising code for removing interpacket gap.

12. The computer-readable storage medium of claim 10 further comprising code for removing a frame check sequence field.

13. The computer-readable storage medium of claim 10 wherein said received packet is a 10 Gigabit Ethernet LAN packet and wherein said transported packet corresponds to a frame structure set forth in ITU G.709 standard.

14. The computer-readable storage medium of claim 10 wherein said overhead comprises four or less bytes.

15. Apparatus for encapsulating a packet for transport over an optical transport network, comprising:
    means for receiving a Gigabit Ethernet packet at a network device;
    means for encapsulating said packet, said encapsulating means comprising:
       means for replacing a preamble and a start of frame delimiter in said received Ethernet packet with overhead comprising a field configured to identify a client signal fail and a channel ID, wherein said overhead comprises a fewer number of bytes than the number of bytes removed from said packet, wherein replacing comprises removing eight bytes and inserting four bytes into said packet; and
    means for transporting said packet over the optical transport network;
    whereby said packet is received from a network having a line frequency different than a payload frequency of the optical transport network and said encapsulated packet is configured for transport directly over the optical transport network without modification to compensate for the different frequencies.

16. The apparatus of claim 15 wherein said overhead comprises four or less bytes.

17. A method for mapping an Ethernet frame to an optical transport network, the method comprising:
   receiving an Ethernet packet from a network operating at a first frequency;
   removing a preamble field and a start of frame delimiter field from the Ethernet packet;
   replacing said preamble field and said start of frame delimiter field with overhead in the packet, said overhead comprising a field configured to identify a client signal fail and a channel ID, wherein replacing comprises removing eight bytes and inserting four bytes into said packet; and
   transporting the packet directly over the optical transport network operating at a second frequency different from said first frequency.

18. The method of claim 17 wherein said overhead comprises at least one length indication field, a PBYTE field, and a header error correction field.

19. The method of claim 17 wherein said overhead comprises four or fewer bytes.

* * * * *